United States Patent [19]

Ishihara et al.

[11] Patent Number: 5,805,548
[45] Date of Patent: Sep. 8, 1998

[54] INFORMATION READING APPARATUS

[75] Inventors: Kanji Ishihara; Shinichi Okada; Keiji Katata, all of Tokorozawa, Japan

[73] Assignee: Pioneer Electronic Corporation, Tokyo, Japan

[21] Appl. No.: 697,838

[22] Filed: Aug. 30, 1996

[30] Foreign Application Priority Data

Sep. 7, 1995 [JP] Japan .................................. 7-255668

[51] Int. Cl.⁶ ...................................................... G11B 7/00
[52] U.S. Cl. ............................. 369/50; 369/58; 369/59; 369/60
[58] Field of Search ................................ 369/50, 58, 47, 369/48, 49, 54, 59, 60, 32

[56] References Cited

U.S. PATENT DOCUMENTS

| 5,517,477 | 5/1996 | Sako ........................................ 369/50 X |
| 5,587,978 | 12/1996 | Endo et al. ............................ 369/49 X |

*Primary Examiner*—Muhammad N. Edun
*Attorney, Agent, or Firm*—Morgan, Lewis and Bockius LLP

[57] ABSTRACT

An information reading apparatus has a feature that, when a disc on which data is recorded by a CLV system is read out by a CAV system, a transfer rate is changed in accordance with an amount of data recorded on the disc and the data can be efficiently read out in a short time. In an information reading apparatus arranged such that data read by rotating at a constant angular velocity a disk-shaped recording medium on which data is recorded at a constant linear velocity is transmitted to an external apparatus through a buffer memory, there is provided a setting unit for setting a rotational angular velocity of the disk-shaped recording medium in a manner such that a transfer rate when the information read at a predetermined radial position excluding the outermost peripheral portion in the information recording region of the disk-shaped recording medium is transferred to the buffer memory is equal to the maximum sustain transfer rate at which the information reading apparatus can perform the reading operation.

12 Claims, 11 Drawing Sheets

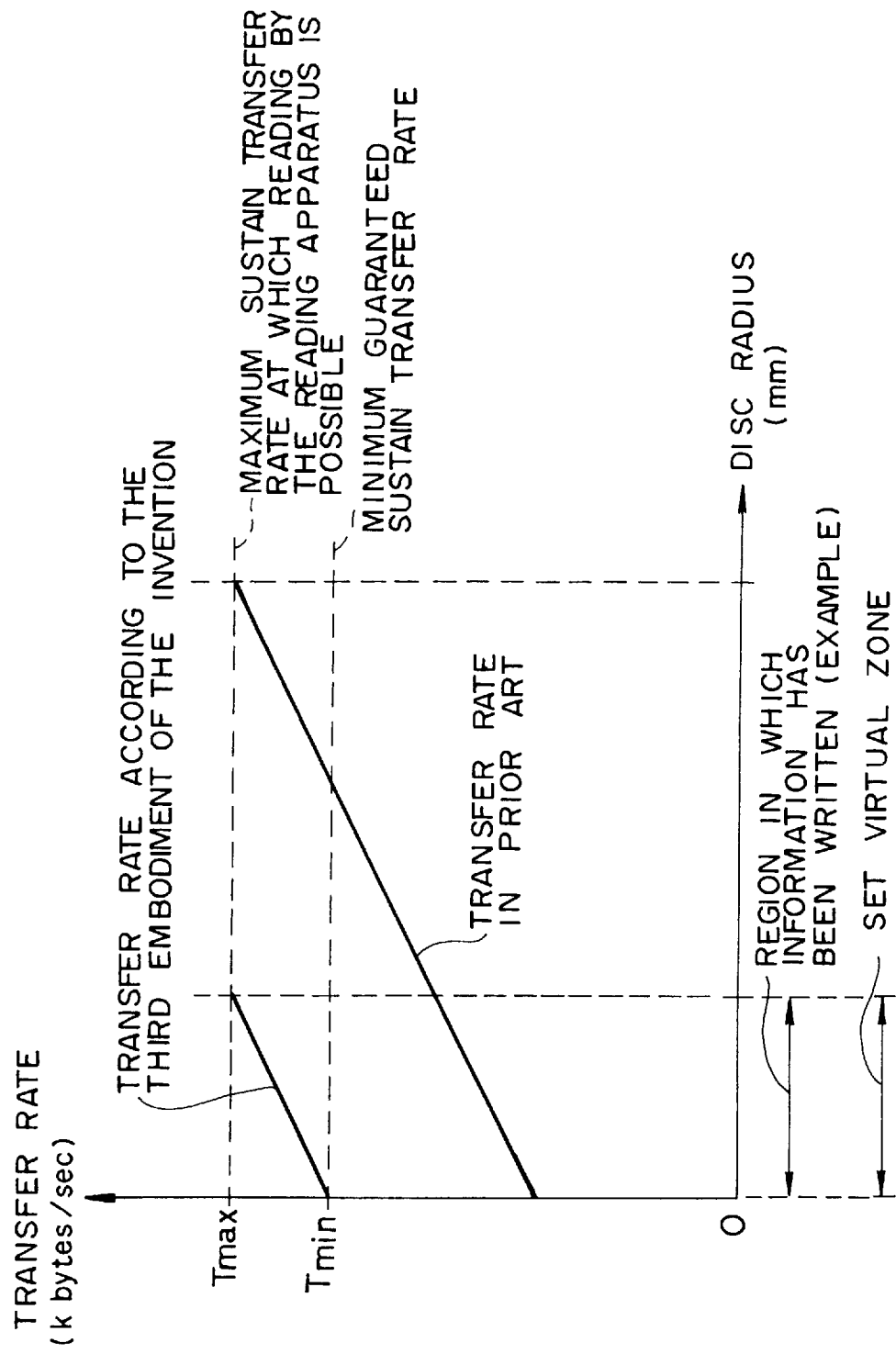

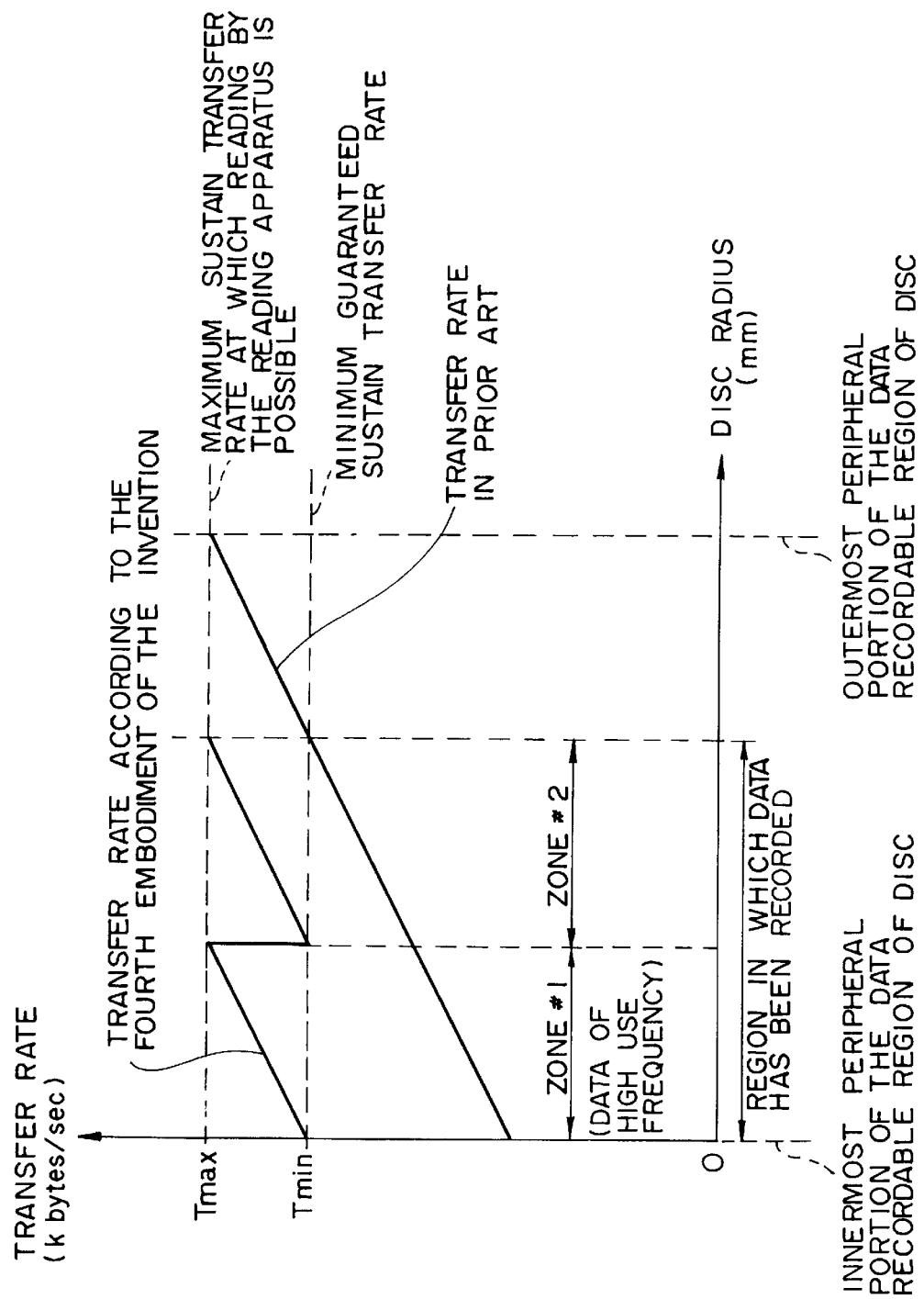

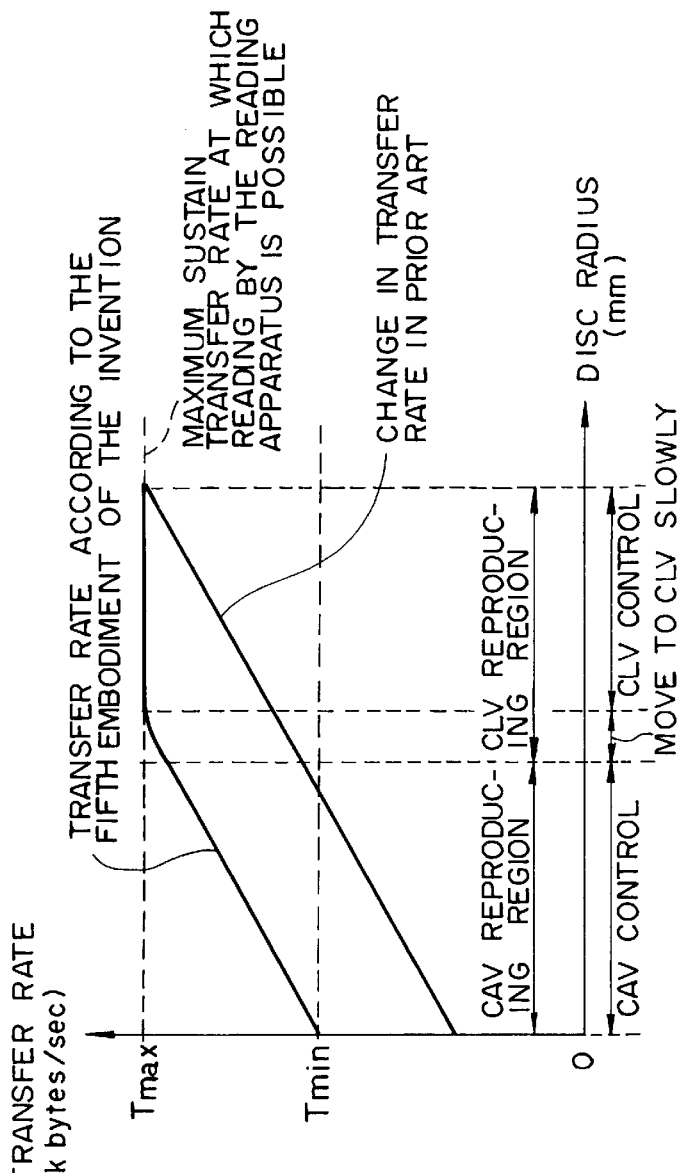
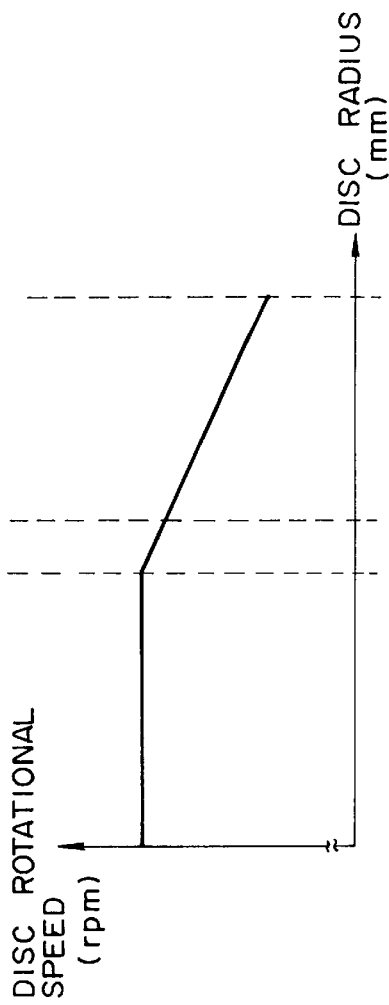

INFORMATION READING APPARATUS

BACKGROUND OF THE INVENTION

1. Field of the Invention

The invention relates to an information reading apparatus of what is called a CLV (Constant Linear Velocity) disc in which information has been recorded at a constant linear velocity.

2. Description of Background Information

Recently the use of CD-ROM, wherein the so-called CD (Compact Disc) for reproduction of music is used as an ROM (Read Only Memory) for a computer or the like, has become ordinary in view of their large memory capacity.

The CD-ROM is a storage medium in which digital data, program, or the like has been recorded in place of a music signal in a data recording region provided in a predetermined portion of the disc (CD). In the CD-ROM, pits carrying data are spirally arranged from a predetermined inner peripheral portion of the disc toward an outer periphery, a lead-in area is formed from the innermost peripheral portion to a predetermined radial position, a data recording region in which information such as data, program, or the like for a computer can be recorded is subsequently set on the outer peripheral side, and data is recorded in a range as necessary. Following the region in which data is recorded, a lead-out area is formed without exceeding a predetermined radial position. In the lead-in area, information to identify those regions recorded in the disc, block address information which is a table of contents information (TOC) of the data and has been replaced to a block number of the data or time information or the like has been recorded. An optical pickup unit previously reads out the TOC of the lead-in area, so that a disc radial position in which target data has been recorded is calculated. As mentioned above, the pickup of a CD-ROM player allows the information recorded in the disc to be followed from the disc inner peripheral side toward the outer peripheral direction, thereby reading it. Since the CD-ROM can be cheaply supplied by mass production, the CD-ROM is given attention as a typical recording medium for the recently developed multi-media devices.

As mentioned above, the CD-ROM records data for a computer or a compressed digital signal as recording information in place of music information and, from a viewpoint of the improvement of a recording density, information is recorded by a CLV system in a manner similar to the CD for music.

When the CD-ROM is used as an external ROM for a computer, it is required to reduce a time (access time) which is necessary to move an optical pickup to a position on the disc in which desired data has been recorded and to read out the information. When recording information in the disc of the CLV system is read, in order to hold a linear velocity upon disc rotation constant, it is necessary to control a rotational angular velocity of the disc in accordance with a radial position of the recording data so that a maximum rotational angular velocity is obtained at the inner peripheral portion of the data recording region of the disc and the angular velocity is decreased as the optical pickup moves to the outer peripheral portion of the disc.

When the optical pickup is moved to read the data of the CD-ROM and a seek operation is performed in a region in which the data has been recorded, therefore, the rotation of a spindle motor for driving the disc needs to be changed until the linear velocity at a target position becomes constant for a short time. There are drawbacks such that a load of the spindle motor increases and, when the optical pickup seeks in the recording region, the access time increases, so that an electric power consumption also increases.

Various kinds of techniques, therefore, such that the CD-ROM is rotated by a CAV (Constant Angular Velocity) system of a constant rotational speed and the recording information of the disc is read for a short time have been proposed.

Since data of the CD-ROM has, however, been recorded on the assumption that the data is reproduced under a condition of the constant linear velocity upon reproduction, when the CD-ROM is CAV reproduced, a transfer rate of the data at the inner and outer peripheries of the disc largely changes.

More specifically speaking, assuming that a rotational speed of the disc is equal to about 1000 r.p.m., the transfer rate increases as a recording portion of the information to be read moves to the outer periphery of the disc, and although the transfer rate is equal to about 350 kbytes/second at the innermost periphery, the transfer rate is equal to about 875 kbytes/sec at the outermost periphery, so that a change in transfer rate of about 2.5 times occurs in the information recording region of the same disc.

Therefore, for example when the CD-ROM player sets the rotational angular velocity of the disc to be higher than the conventional velocity in order to transfer the data of the disc to a host computer with a raised transfer rate, in the case where the optical pickup seeks and reads a part of the data recorded on the outer peripheral side of the disc, the transfer rate will exceed the maximum sustain transfer rate at which the CD-ROM player can perform a reading because of a limitation of a hardware of a signal processing system, so that the information cannot be perfectly read out.

A signal processing unit in the player to process the data read out from the CD-ROM, therefore, sets the rotational angular velocity of the disc so that the CD-ROM reads the information at the maximum sustain transfer rate at which the player can process at the outermost periphery of the information recording region while considering a case where the data has been recorded up to the outermost periphery of the information recording region.

When the data is read out from the inner peripheral portion of the information recording region of the disc, however, since the data is read at a transfer rate that is fairly lower than the maximum processing ability of the player, there occurs a problem such that the sustain transfer rate of the data in the inner peripheral portion decreases. There consequently is a drawback such that a minimum guaranteed value of the transfer rate of the data, namely, the transfer rate at which the apparatus can continuously transfer the data cannot be raised in the innermost peripheral portion of the information recording region of the disc.

OBJECTS AND SUMMARY OF THE INVENTION

The invention has been made in view of the above problems and there is provided an information reading apparatus in which when a disc in which information has been recorded by a CLV system is read out by a CAV system, a transfer rate is changed in accordance with an information amount recorded in the disc and which can efficiently read out the information for a short time.

According to the first aspect of the invention, there is provided an information reading apparatus such that information read out by rotating at a constant angular velocity a disk-shaped recording medium in which the information has been recorded at a constant linear velocity is transmitted to an external apparatus through a buffer memory, comprising setting means for setting an angular velocity of a rotation of the disk-shaped recording medium in a manner such that a transfer rate when transferring the read information to the buffer memory at a predetermined radial position excluding the outermost peripheral portion of an information recording region of the disk-shaped recording medium is set to a maximum sustain transfer rate at which the information reading apparatus can perform the reading.

According to the second aspect of the invention, there is provided the information reading apparatus according to the first aspect of the invention, wherein the radial position is determined on the basis of recording region information recorded in the disk-shaped recording medium.

According to the third aspect of the invention, there is provided an information reading apparatus such that information read by rotating at a constant angular velocity a disk-shaped recording medium in which information has been recorded at a constant linear velocity is transmitted to an external apparatus through a buffer memory, comprising setting means for setting an angular velocity of a rotation of the disk-shaped recording medium in a manner such that a transfer rate when transferring the read information to the buffer memory at a radial position corresponding to the outermost peripheral portion of a region in which the information of the disk-shaped recording medium has been recorded is set to a maximum sustain transfer rate at which the information reading apparatus can perform a reading.

According to the fourth aspect of the invention, there is provided the information reading apparatus according to the third aspect of the invention, wherein the radial position is determined on the basis of recording region information recorded in the disk-shaped recording medium.

According to a further aspect of the invention, there is provided an information reading apparatus such that information read by rotating at a constant angular velocity a disk-shaped recording medium in which information has been recorded at a constant linear velocity is transmitted to an external apparatus through a buffer memory, comprising setting means for setting an angular velocity of the rotation of the disk-shaped recording medium and position detecting means for detecting a radial position corresponding to the outermost peripheral portion of a region in which information of the disk-shaped recording medium has been recorded, wherein the setting means sets the angular velocity of the rotation of the disk-shaped recording medium in a manner such that a transfer rate when transferring the information read from the disk-shaped recording medium to the buffer memory is set to a maximum sustain transfer rate at which the information reading apparatus can perform a reading at the radial position corresponding to the outermost peripheral portion of the region in which the information detected by the position detecting means has been recorded.

According to a still further aspect of the invention, there is provided an information reading apparatus such that information read by rotating at a constant angular velocity a disk-shaped recording medium in which the information has been recorded at a constant linear velocity is transmitted to an external apparatus through a buffer memory, comprising setting means for setting an angular velocity on the basis of a minimum guaranteed sustain transfer rate of the information reading apparatus and detecting means for detecting that a transfer rate when transferring the information read from the disk-shaped recording medium to the buffer memory has reached a maximum sustain transfer rate at which the information reading apparatus can perform a reading, wherein when the detecting means detects that the transfer rate has reached the maximum sustain transfer rate at which the information reading apparatus can perform a reading, the setting means resets the angular velocity so that the transfer rate is not lower than the minimum guaranteed sustain transfer rate.

According to a further aspect of the invention, there is provided an information reading apparatus such that information read from a disk-shaped recording medium in which the information has been recorded at a constant linear velocity is transmitted to an external apparatus through a buffer memory, comprising rotation control means for rotating the disk-shaped recording medium at a constant angular velocity in a range from the innermost peripheral portion of a region of the disk-shaped recording medium in which the information has been recorded to a predetermined radial position and for rotating the disk-shaped recording medium at a constant linear velocity after the predetermined radial position.

According to a still further aspect of the invention, in the information reading apparatus, the angular velocity is set on the basis of the minimum guaranteed sustain transfer rate of the information reading apparatus.

According to a still further aspect of the invention, in the information reading apparatus, the linear velocity is set on the basis of the maximum sustain transfer rate at which the information reading apparatus can perform a reading.

According to a still further aspect of the invention, in the information reading apparatus, when the disk-shaped recording medium is rotated at a constant angular velocity, the radial position is set to a radial position from the innermost peripheral portion of the information recording region of the disk-shaped recording medium at a time point when a transfer rate in case of transferring the information read from the disk-shaped recording medium to the buffer memory has reached the maximum sustain transfer rate at which the information reading apparatus can perform a reading.

According to a still further aspect of the invention, there is provided an information reading apparatus such that information read from a disk-shaped recording medium in which the information has been recorded at a constant linear velocity is transmitted to an external apparatus through a buffer memory, comprising rotation control means for controlling a rotation of the disk-shaped recording medium and detecting means for detecting that a transfer rate when transferring the information read from the disk-shaped recording medium to the buffer memory has reached a maximum sustain transfer rate at which the information reading apparatus can perform a reading, wherein when the information read from the disk-shaped recording medium is transferred to the buffer memory, the rotation control means switches the rotation of the disk-shaped recording medium from the constant angular velocity control to the constant linear velocity control in accordance with an output signal of the detecting means and controls.

According to a still further aspect of the invention, in the information reading apparatus, when the rotation of the disk-shaped recording medium is switched from the constant angular velocity control to the constant linear velocity control and is controlled, the rotation control means controls the value of the linear velocity in a manner such that the information read from the disk-shaped recording medium is transferred to the buffer memory at the maximum sustain transfer rate at which the information reading apparatus can perform a reading.

Since the invention is constructed as mentioned above, according to the first aspect of the invention when the information of the disc recorded at a constant linear velocity is read at a constant angular velocity and is transmitted to the external apparatus, in the information recording region of the disc which has been determined as an information recordable region, even if the information is recorded in a narrow region, the information reading apparatus sets a rotational angular velocity of the disc so as to obtain the maximum sustain transfer rate at which the apparatus can perform a reading at the radial position at which the region of the information recorded in the disc is covered. The access time is also, consequently, short and the information of the disc can be generated at a speed higher than the conventional one.

According to the second aspect of the invention, when information of a disc recorded at a constant linear velocity is read at a constant angular velocity and is transmitted to an external apparatus, in an information recording region of the disc which has been determined as an information recordable region, even if the information has been recorded in a narrow region, on the basis of recording region information such as a TOC or the like to be previously read, the information reading apparatus sets a rotational angular velocity of the disc so as to obtain the maximum sustain transfer rate at which the apparatus can perform a reading at the radial position where the region of the information recorded on the disc is covered. The access time, consequently, is short and the information of the disc can be generated at a speed higher than the conventional one.

According to the third aspect of the invention, when information of a disc recorded at a constant linear velocity is read at a constant angular velocity and is transmitted to an external apparatus, irrespective of an extent of a region of information which is recorded to an information recording region of the disc which has been determined as an information recordable region, the information reading apparatus sets the rotational angular velocity of the disc so as to obtain the maximum sustain transfer rate at which the apparatus can perform a reading at the radial position corresponding to the outermost peripheral portion in the region of the information recorded on the disc. The access time, consequently, is also short and the information of the disc can be generated at a speed higher than the conventional one.

According to the fourth aspect of the invention, when information of a disc recorded at a constant linear velocity is read at a constant angular velocity and is transmitted to an external apparatus, irrespective of an extent of a region of information which is recorded to an information recording region of the disc which has been determined as an information recordable region, on the basis of recording region information such as a TOC or the like to be previously read, the information reading apparatus sets the rotational angular velocity of the disc so as to obtain the maximum sustain transfer rate at which the apparatus can perform the reading at the radial position corresponding to the outermost peripheral portion in the region of the information recorded on the disc. The access time, consequently, is also short and the information of the disc can be generated at a speed higher than the conventional one.

According to the further aspect of the invention, when information of a disc recorded at a constant linear velocity is read at a constant angular velocity and is transmitted to an external apparatus, the radial position corresponding to the outermost peripheral portion in a region of the information recorded on the disc is detected by position detecting means, and at such a radial position, the rotational angular velocity of the disc is set so as to obtain the maximum sustain transfer rate at which the apparatus can perform the reading. The access time, consequently, is also short and the information of the disc can be generated at a speed higher than the conventional one.

According to the still further aspect of the invention, when information of a disc recorded at a constant linear velocity is read at a constant angular velocity and is transmitted to an external apparatus, the angular velocity is set to a value at which the innermost peripheral portion of the recorded information is read at the minimum guaranteed sustain transfer rate of the apparatus, and while reading the information, a value of the changing transfer rate is monitored, and when the transfer rate reaches the maximum sustain transfer rate at which the apparatus can perform the reading, the value of the angular velocity is reset so as to obtain a transfer rate which is not lower than the minimum guaranteed sustain transfer rate. The apparatus, consequently, can generate the information of the disc at a speed higher than the conventional one without exceeding the maximum sustain transfer rate at which the apparatus can perform the reading.

According to the further aspect of the invention, when information of a disc recorded at a constant linear velocity is read and transmitted to an external apparatus, the apparatus distinguishes the information recorded on the disc into a region on the inner peripheral side and a region on an outer peripheral side at a predetermined radial position, reads the information at a constant angular velocity in the inner peripheral side region, and reads the information at a constant linear velocity in the outer peripheral side region. Thus, the information of the disc can be generated at a speed higher than the conventional one.

According to the still further aspect of the invention, when information of a disc recorded at a constant linear velocity is read and transmitted to an external apparatus, the apparatus distinguishes the information recorded on the disc into a region on the inner peripheral side and a region on an outer peripheral side at a predetermined radial position, sets the angular velocity to a value at which the innermost peripheral portion of the recorded information is read at the minimum guaranteed sustain transfer rate of the apparatus in the inner peripheral side region, reads the information at a constant angular velocity, and reads the information of the disc at a constant linear velocity in the outer peripheral side region. The apparatus, consequently, can generate the information of the disc at a speed higher than the conventional one without being lower than the minimum guaranteed sustain transfer rate.

According to the still further aspect of the invention, when information of a disc recorded at a constant linear velocity is read and transmitted to an external apparatus, the apparatus distinguishes the information recorded on the disc into a region on the inner peripheral side and a region on an outer peripheral side at a predetermined radial position, sets the angular velocity to a value at which the innermost peripheral portion of the recorded information is read at the minimum guaranteed sustain transfer rate of the apparatus in the inner peripheral side region, reads the information at a constant angular velocity, sets a value of the linear velocity on the basis of the maximum sustain transfer rate at which the apparatus can perform the reading in the outer peripheral side region, and reads the information of the disc at a constant linear velocity.

The apparatus, consequently, can generate the information of the disc at a speed higher than the conventional one without being lower than the minimum guaranteed sustain transfer rate and, even in the outer peripheral side region, without exceeding the maximum sustain transfer rate at which the information of the disc can be read.

According to the still further aspect of the invention, when information of a disc recorded at a constant linear velocity is read and transmitted to an external apparatus, the apparatus distinguishes the information recorded on the disc into a region on the inner peripheral side and a region on an outer peripheral side at a predetermined radial position, sets the value of the angular velocity at which the transfer rate of the information at the predetermined radial position to distinguish the inner peripheral side and the outer peripheral side is set to the maximum sustain transfer rate at which the apparatus can perform the reading, reads the information of the disc at a constant angular velocity in the inner peripheral side region, and reads the information of the disc at a constant linear velocity in the outer peripheral side region. The information of the disc, consequently, can be transmitted at a speed higher than the conventional one.

According to the still further aspect of the invention, when information of a disc recorded at a constant linear velocity is transmitted to an external apparatus, the information of the disc is read at a constant angular velocity, and when the transfer rate reaches the maximum sustain transfer rate at which the apparatus can perform the reading, the control mode is switched to the constant linear velocity control and the apparatus is controlled. The information of the disc, consequently, can be generated at a speed higher than the conventional one without exceeding the maximum sustain transfer rate at which the apparatus can perform the reading.

According to the still further aspect of the invention, when information of a disc recorded at a constant linear velocity is transmitted to an external apparatus, the information of the disc is read at a constant angular velocity, and when the transfer rate reaches the maximum sustain transfer rate at which the apparatus can perform the reading, the linear velocity at which the apparatus can perform the reading at the maximum sustain transfer rate is set, the control mode is switched to the constant linear velocity control and the apparatus is controlled. The information of the disc, consequently, can be generated at a speed higher than the conventional one without exceeding the maximum sustain transfer rate at which the apparatus can perform the reading.

BRIEF DESCRIPTION OF THE DRAWINGS

FIG. 7 is a graph showing the relation between a virtual zone and a transfer rate of a disc which is read by an information reading apparatus in the third embodiment of the invention;

FIG. 8 is a graph showing the relation between a virtual zone and a transfer rate of a disc which is read by an information reading apparatus in the fourth embodiment of the invention;

FIG. 9 is a graph showing the relations among a CAV region and a CLV region of a disc, a transfer rate and a rotational speed of data which are set by an information reading apparatus in the fifth embodiment of the invention;

DETAILED DESCRIPTION OF THE PREFERRED EMBODIMENTS

Embodiments of an information reading apparatus in the invention will now be described hereinbelow with reference to FIGS. 1 to 11.

Figure 1:
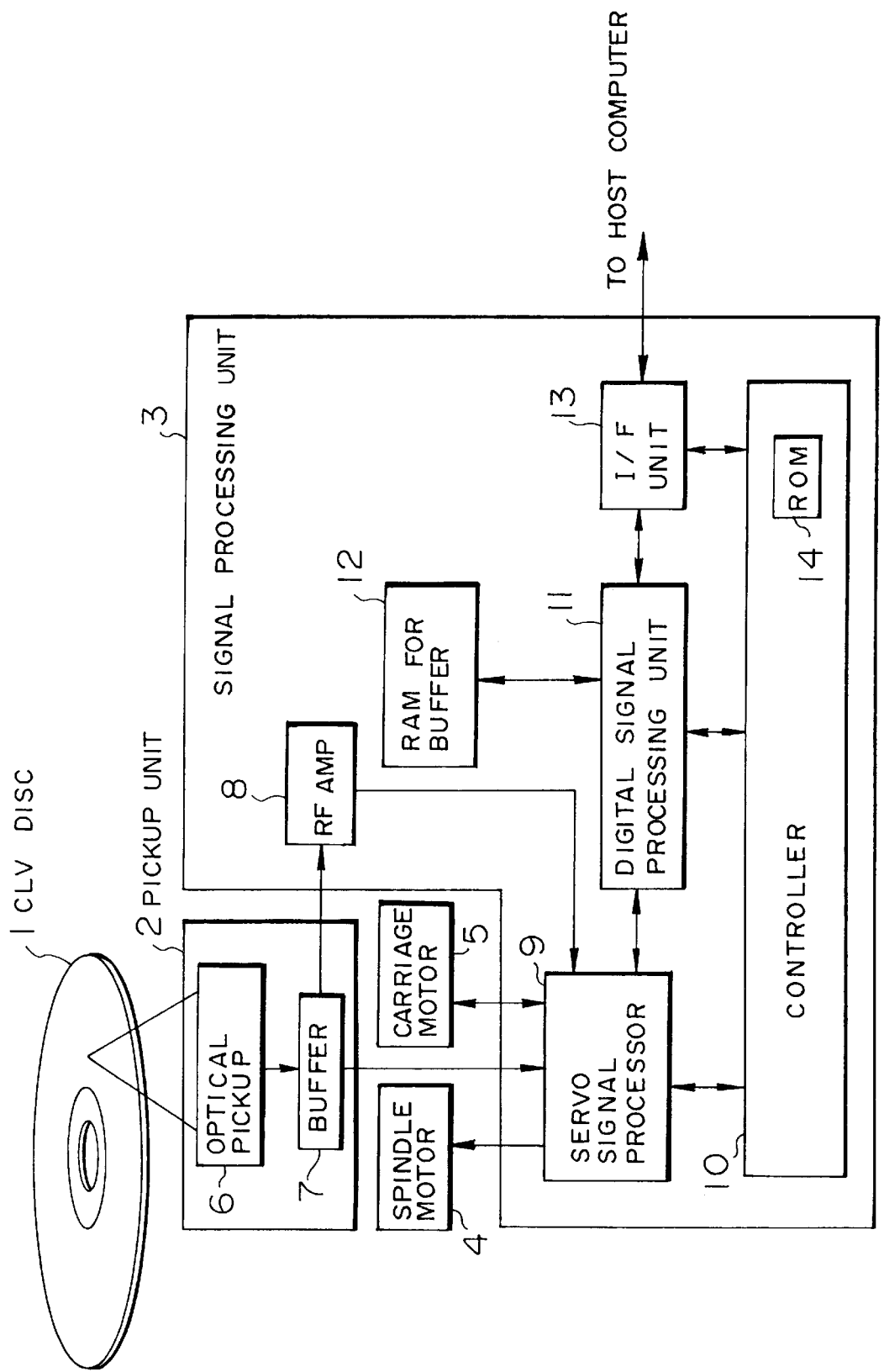
FIG. 1 is a block diagram showing a schematic construction of a CD-ROM player embodying an information reading apparatus in the invention.

FIG. 1 is a block diagram showing a schematic construction of a CD-ROM player according to the first embodiment of the information reading apparatus in the present invention. In the diagram, the CD-ROM player is constructed by: a pickup unit 2 for reading information from a CLV disc 1 as a CD-ROM on which information has been recorded at a constant linear velocity and for converting into an electric signal; a signal processing unit 3 for processing the electric signal based on the detected information, for transmitting the processed signal to a host computer (not shown) which is connected to the CD-ROM player, and for generating a servo signal of the pickup unit 2 in order to properly detect information; a spindle motor 4 constructing disc driving means for rotating the CLV disc 1 on the basis of a rotational speed control signal included in the servo signal from the signal processing unit 3; and a carriage motor 5 for driving a carriage (not shown) to convey the pickup unit 2.

The pickup unit 2 is constructed by: an optical pickup 6 for irradiating a detection light to a pit of the CLV disc 1, for receiving the reflected light, for converting into an electric signal, and for generating the electric signal; and a buffer 7 for once storing an output from the optical pickup 6 and generating at a predetermined timing.

The signal processing unit 3 includes: an RF amplifier 8; a servo signal processor 9; a digital signal processing unit 11; an RAM 12 for buffer; an interface 13; and a controller 10 for controlling the operation of each of the above portions.

The RF amplifier 8 amplifies an RF signal from the buffer 7. Under a control of the controller 10, the servo signal processor 9 generates servo signals for a focusing servo, a tracking servo, a carriage servo, and a spindle servo in the optical pickup 6 on the basis of the RF signal from the RF amplifier 8 and a position detection signal of a detection light from an optical pickup position sensor (not shown) provided for the pickup unit 2.

Under the control of the controller 10, the digital signal processing unit 11 executes an error correction, a deinterleave, and the like to the RF signal that is supplied through the servo signal processor 9, transmits the processed signal to the buffer RAM 12 as a buffer memory, reads out information accumulated in the buffer RAM 12 at a predetermined timing, and supplies the information to the interface unit 13. The controller 10 has a microcomputer including a CPU, an RAM, an input/output bus, and the like and, further, has a rotational speed control unit (not shown). On the basis of outputs from the servo signal processor 9 and digital signal processing unit 11, the controller 10 switches a rotational speed control flag in the controller from 0 (initial set value) to 1, controls a rotational speed of the spindle motor, controls a rotation of the CLV disc 1 which rotates integratedly with the spindle motor, drives the carriage motor 5, and moves the optical pickup 6 to a predetermined radial position of the CLV disc 1.

Under the control of the controller 10, the interface unit 13 executes an interface operation to the information generated from the digital signal processing unit 11 and transmits the information to the host computer (not shown) at a transfer rate that is set by the controller 10. The controller 10 controls the whole CD-ROM player on the basis of a predetermined program stored in an ROM 14.

Figure 3:
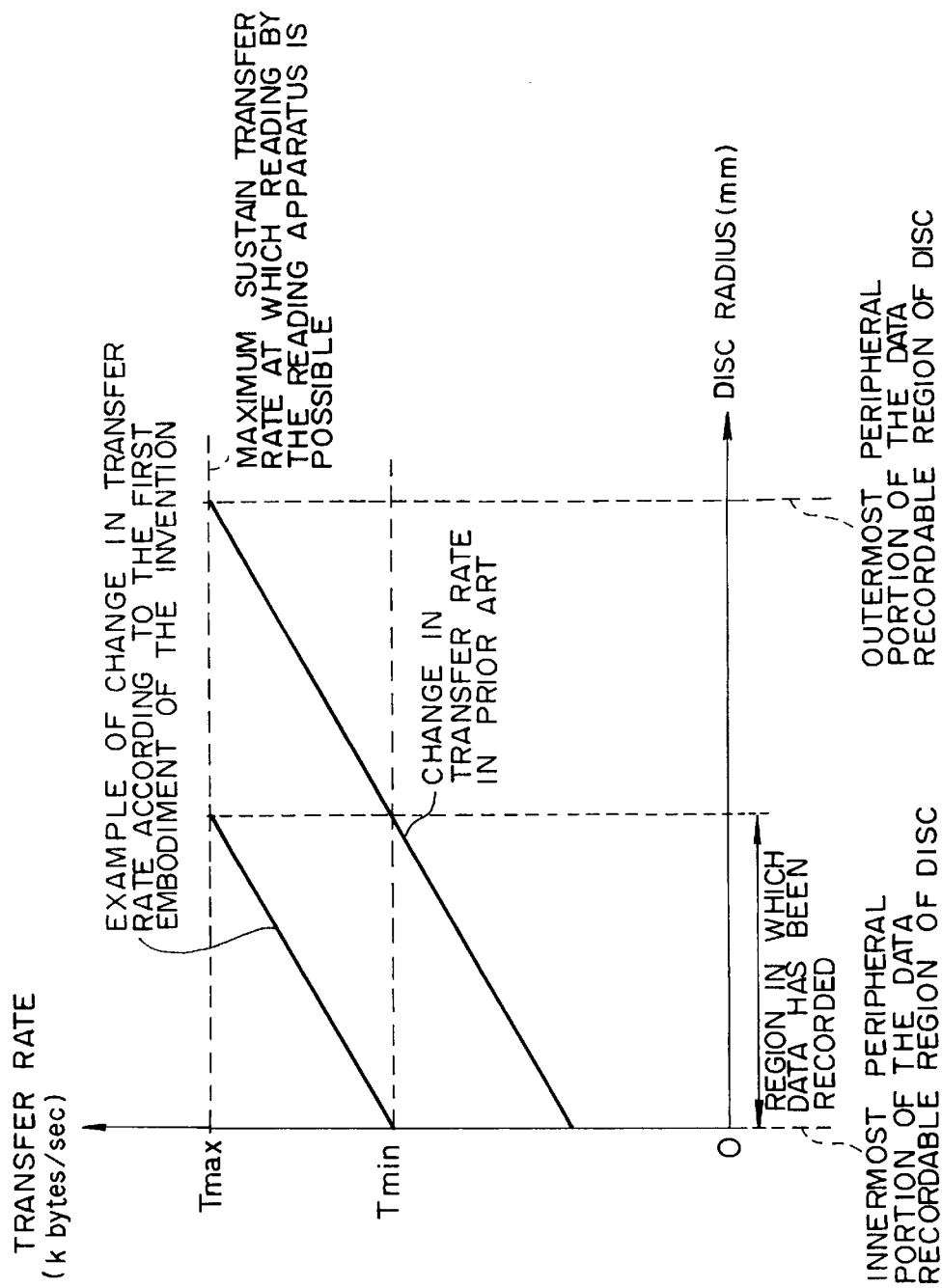
FIG. 3 is a graph showing the relation between a radius and a transfer rate of a disc in which a data amount is relatively small and is read by the information reading apparatus in the first embodiment of the invention.
Figure 4:
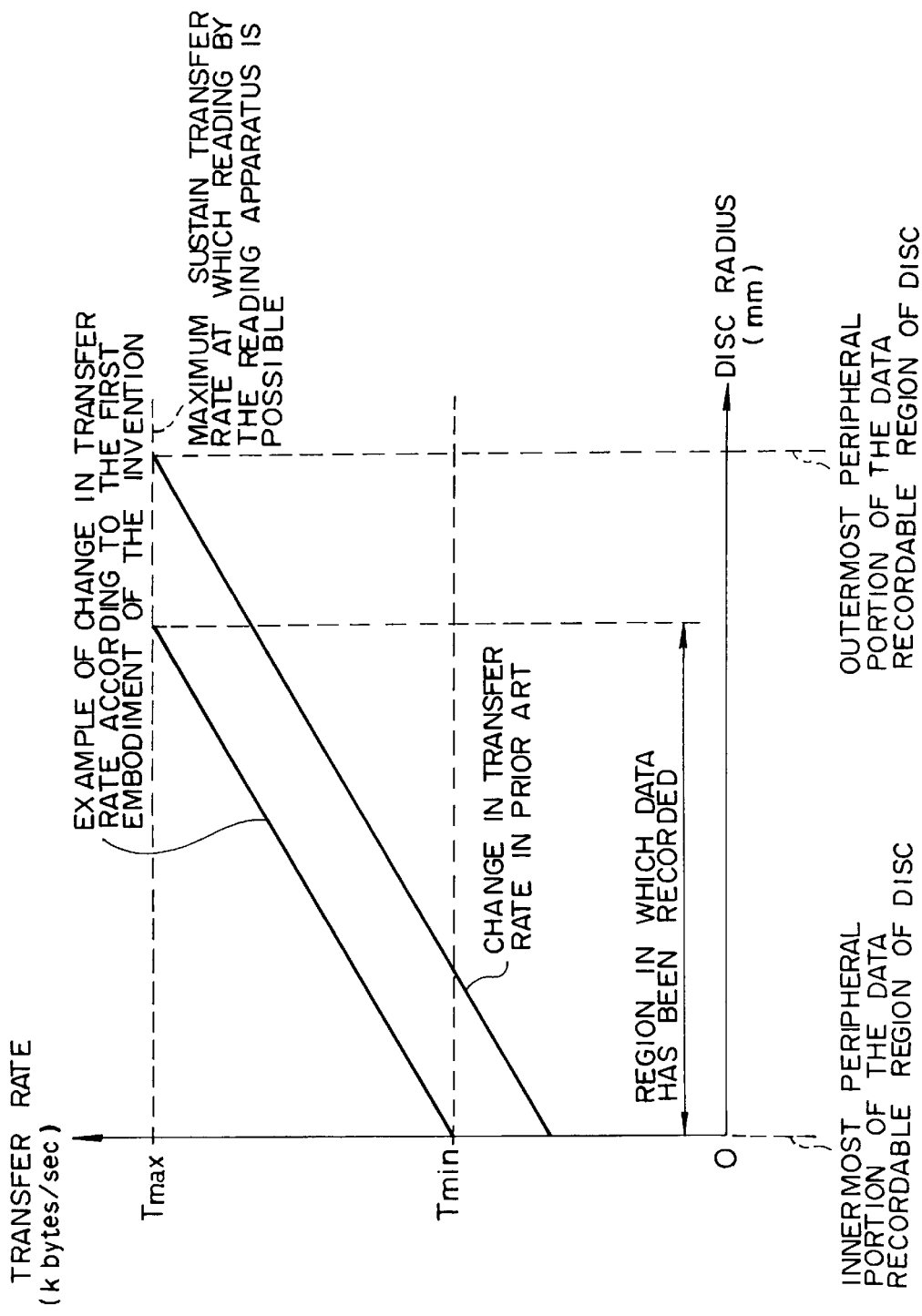
FIG. 4 is a graph showing the relation between a radius and a transfer rate of a disc in which a data amount is relatively large and is read by the information reading apparatus in the first embodiment of the invention.

A state in which the CD-ROM player in the first embodiment of the invention controls the rotational speed of the CLV disc and reads out necessary information will now be described with reference to FIGS. 2 to 4.

Figure 2:
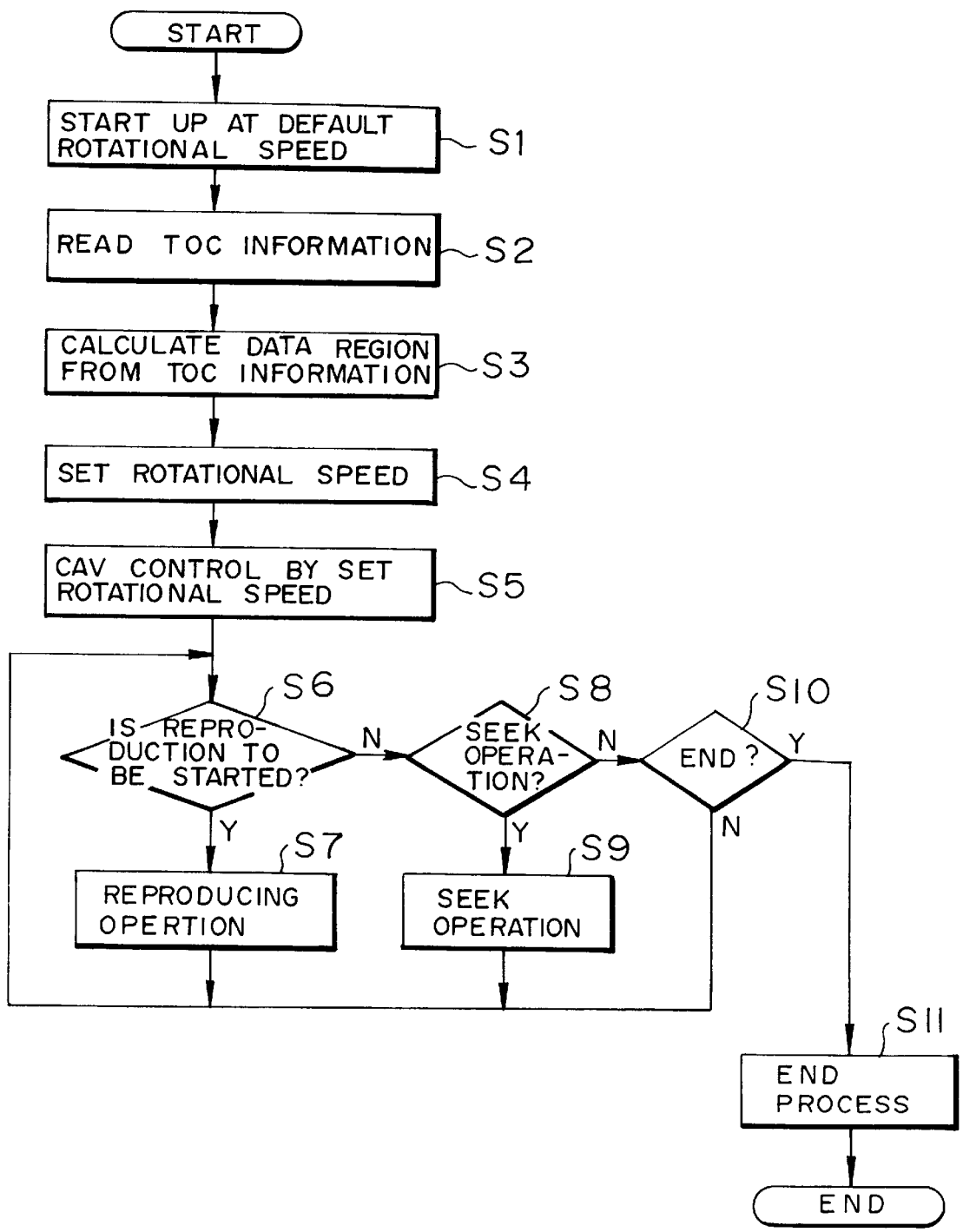
FIG. 2 is a diagram showing an operation flowchart of a controller of the information reading apparatus in the first embodiment of the invention.

FIG. 2 shows the first embodiment of the invention and is an operation flowchart for the controller showing a state in which the controller 10 of the CD-ROM player in FIG. 1 controls the rotational speed of the CLV disc 1 and reads out necessary information.

In FIG. 2, the controller first performs an initial-setting of the rotational speed of the spindle motor 4 in FIG. 1 to a default rotational speed, rotates the disc, drives the carriage motor 5, and moves the optical pickup 6 to a lead-in area provided in the innermost peripheral portion of a recording information region of the CLV disc 1 (step S1). By reading the TOC information of the CLV disc 1 subsequently, a total amount of the information recorded on the disc is read out and, after that, the position control is performed so that the optical pickup 6 pauses at the innermost peripheral portion of the recorded data and enters a standby state for the reading operation (step S2).

A region in which the data has been recorded is subsequently calculated by the TOC information (step S3). Together with the servo signal processor 9 and digital signal processing unit 11, by using the value of the radius of the disc corresponding to the data recorded region, as shown in FIG. 3, the controller 10 calculates a rotational angular velocity of the disc or sets a rotational angular velocity of the disc with reference to a predetermined table in a manner such that when the optical pickup 6 detects the data in the outermost peripheral portion of the data recorded portion, the rotational speed of the disc is set to the maximum sustain transfer rate (Tmax) at which the apparatus can perform the reading (step S4). Subsequently, the controller 10 drives the spindle motor 4 at the rotational speed having the set angular velocity and CAV (constant angular velocity) controls the disc to a predetermined rotational speed (step S5).

Whether the reproduction is to be started or not is now judged (step S6). When the reproduction is to be started, together with the servo signal processor 9 and digital signal processing unit 11, the controller 10 executes a reproducing operation so as to transmit the read data to the buffer RAM 12 and to the interface unit 13 and to transmit the data to the host computer as necessary (step S7).

When it is judged that the reproduction is not started, a check is made to see if it is necessary for the optical pickup 6 to seek a region in which the target data to be read has been recorded (step S8). If necessary, the seeking operation is executed (step S9). When the other conditions (not shown) are satisfied, the start of reproduction (step S6) is executed.

When there is no need to execute the seek operation of the optical pickup 6, the reproduction is finished (step S10). An end process (step S11) to drive the carriage or the like in order to return the optical pickup 6 to the home position is executed. After that, the operation is finished.

As mentioned above, in the control operation shown in FIG. 2, prior to the reproducing operation, the controller sets the angular velocity by the TOC information recorded in the CD-ROM in a manner such that when the apparatus reads the outermost peripheral portion of the data, the maximum sustain transfer rate (Tmax) at which the apparatus can perform the reading is obtained. As shown in FIG. 3, therefore, as compared with the conventional reading apparatus which was set in a manner such that when the apparatus reads the outermost peripheral portion of the data recording region which was determined as a data recordable region of the CD-ROM, the apparatus can perform the reading at the maximum sustain transfer rate (Tmax) at which the apparatus can perform the reading, the recording information of the disc can be read in a short access time and since the value of the minimum guaranteed sustain transfer rate is large, the information of the disc can be generated at high speed.

Particularly, as the disc radius corresponding to the disc in which the data recorded region is small, namely, the outermost peripheral portion of the data recording region is small, the transfer rate of the data in the innermost peripheral portion of the data recording region can be raised, so that the data can be efficiently transferred. As shown in FIG. 4, even when reading a disc in which the data recorded region is relatively large, the transfer rate is not lower than the conventional rate. The access time is consequently short and the information of the disc can be generated at a speed higher than the conventional one.

The maximum sustain transfer rate (Tmax) at which the apparatus can perform the reading is not limited to the outermost peripheral portion in the data recorded region but, for example, when data whose use frequency is large is concentrated in the inner peripheral portion or data whose reading operation has been designated exists within a predetermined radial position of the disc or the like, the angular velocity can be also determined by setting so as to obtain the maximum sustain transfer rate (Tmax) at a predetermined disc radial position in the data recording region. When the transfer rate is set at the predetermined disc radial position in the data recording region, a transfer rate of the data frequently used can be raised, so that the access time is also made short, and the information of the disc can be generated at a speed higher than the conventional one.

A state in which a CD-ROM player in the second embodiment of the invention controls a rotational speed of the CLV disc and reads out necessary information will now be described hereinbelow with reference to FIGS. 5, 6, and 11.

Figure 5:
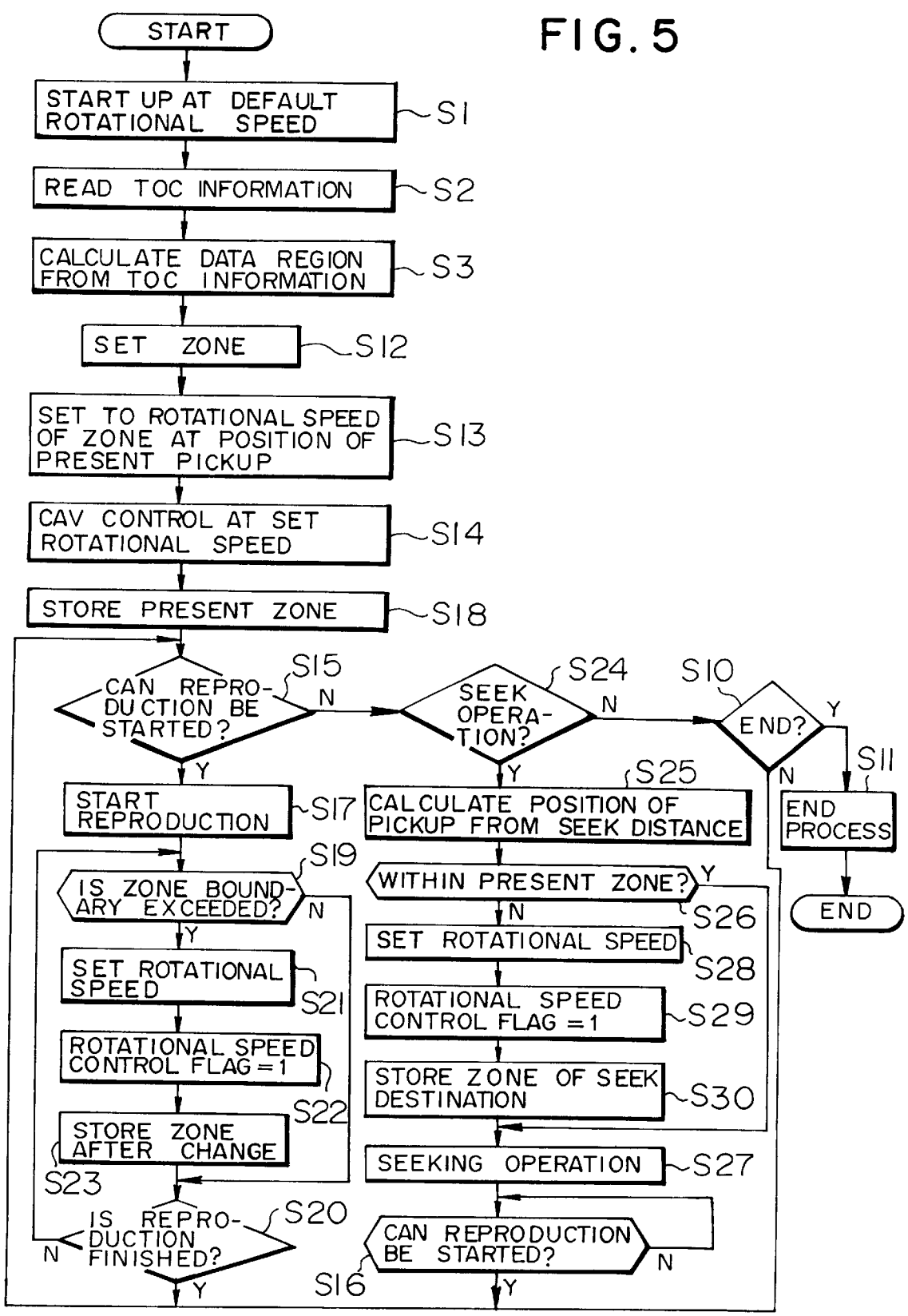
FIG. 5 is a diagram showing an operation flowchart of a controller of an information reading apparatus according to the second embodiment of the invention.

FIG. 5 shows the second embodiment of the invention and is an operation flowchart for the controller showing a state in which the CD-ROM player controller 10 in FIG. 1 controls the rotational speed of the CLV disc 1 and reads necessary information.

In FIG. 5, the same operating steps as those in FIG. 2 are designated by the same reference numerals.

As shown in FIG. 5, after the execution of the steps S1 to S3 in FIG. 2, the controller 10 controls the carriage motor 5 together with the servo signal processor 9 and advances to step S12 while moving the optical pickup 6 to the innermost peripheral portion in the data recorded region. In step S12, as shown in FIG. 6, as for the data recordable region of the disc, the controller 10 assumedly sets, for the information recordable region of the disk, a plurality of zones and a rotational speed transition regions with a predetermined width provided in the innermost peripheral portion of each zone excluding the zone on the innermost peripheral side, independently of the contents of the recording region of the actual disc. The controller 10 also sets a predetermined disc rotational speed for each zone and stores them so that the rotational speed can be identified in correspondence to the data existing in such a zone on the basis of the TOC information which has been read in the lead-in area. FIG. 6 is a graph showing the relations among each of the virtual zones of the disc, transfer rate, and rotational speed which are read by the information reading apparatus in the second embodiment of the invention. In the diagram, the part (a) denotes the relation between each virtual zone of the disc and the transfer rate and the part (b) shows the relation between each virtual zone of the disc and the rotational speed.

The number of zones to be set is set in a manner such that when the data of each zone is read, it can be read at the maximum sustain transfer rate of the apparatus at which the data locating in the outermost peripheral portion of each zone can be read and the data recorded at each zone can be read at a transfer rate which is not lower than the minimum guaranteed sustain transfer rate of the apparatus.

The rotational speed transition region is a region where the rotational speed continuously changes in a manner such that the optical pickup can continuously read from one of the adjacent virtual zones to the other. In this region as well, data is recorded and is read at a transfer rate corresponding to the rotational speed which continuously changes.

Figure 6A:
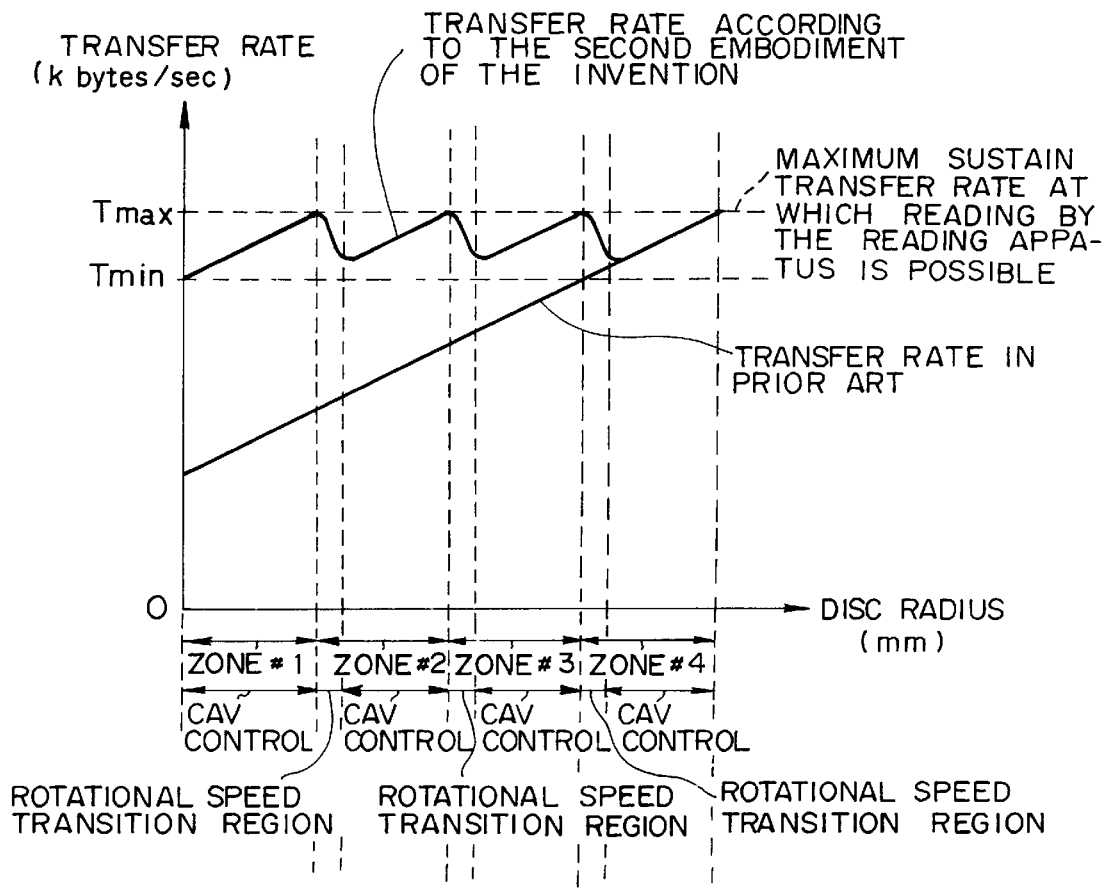
FIG. 6 is a graph showing the relations among each virtual zone, a transfer rate, and a rotational speed of a disc which is read by the information reading apparatus in the second embodiment of the invention.
Figure 6B:
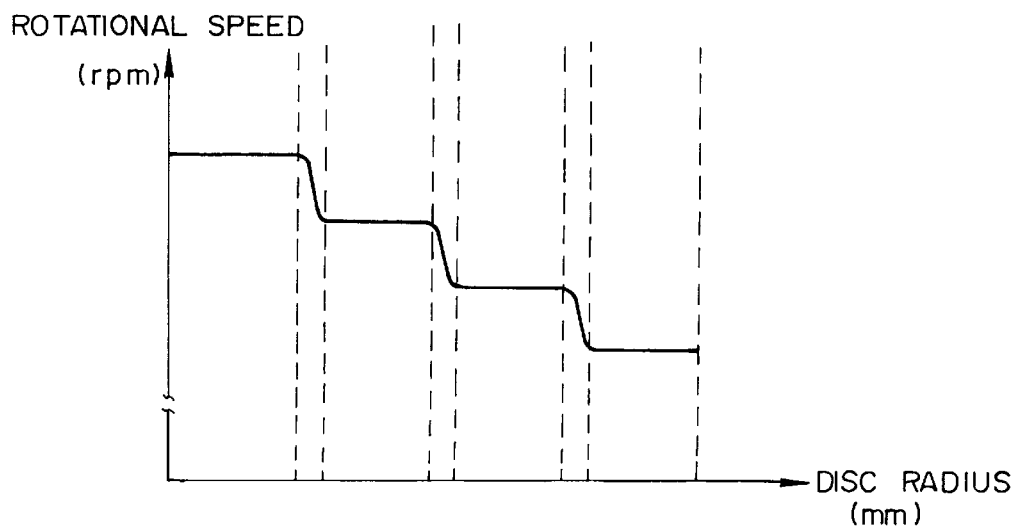

In FIG. 6, for example, four virtual zones (zones #1 to #4) are provided and when the data of each zone is read, the angular velocity of the disc in each zone is set so that all of the transfer rates are not lower than the minimum guaranteed sustain transfer rate of the apparatus and the rotation control can be performed.

By raising the minimum guaranteed sustain transfer rate of the apparatus, therefore, a change amount of the transfer rate of each zone is reduced and a change in corresponding angular velocity of the disc also decreases.

As the number of zones is increased and set, the transfer rate in the portion of the minimum transfer rate of each zone, namely, the innermost peripheral portion of the data of each zone increases and the change in corresponding angular velocity of the disc also decreases.

In FIG. 5, subsequently, when the controller finishes step S12, the processing routine advances to step S13 and the rotational speed is set to the rotational speed corresponding to the virtual zone #1 in which the optical pickup 6 is located at present. Step S14 follows and the disc is controlled to a constant angular velocity so as to obtain the set rotational speed. In step S18, the virtual zone (zone #1 in FIG. 6) in which the optical pickup 6 is located is identified and stored.

A check is now made to see if the optical pickup 6 has moved to the position of the data to be read and the reproduction can be started (step S15).

In step S15, when the optical pickup has reached the position of the data to be read and the reproduction can be started, step S17 follows and the reproduction is started.

The controller 10 subsequently judges whether the optical pickup 6 is locating in the virtual zone where the reproduction of the data during the reading operation has been started or not (step S19). When the pickup is located within the virtual zone in which the reproduction has been started, the reading operation is continued. Step S20 follows and the end of the reproduction is confirmed. Step S15 follows and the reading operation of the data corresponding to a next instruction is started.

When the data during reading exceeds the virtual zone in which the reproduction has been started in step S19, for example, when the data exists over both of the zones #1 and #2 in FIG. 6, the controller judges that the data has exceeded the zone boundary because in the outermost periphery of the zone #1, the transfer rate of the data to be detected by the controller has reached the maximum sustain transfer rate at which the apparatus can perform the reading. The processing routine advances to step S21. In step S21, the controller 10 sets the rotational speed of the disc corresponding to the shifted zone #2. Step S22 follows and a rotational speed control flag is set from 0 to 1. Subsequently, the controller stores the zone #2 after the change (step S23) in place of the zone #1 stored in step S18. The reading operation of the data is continued and step S20 follows.

Figure 11:
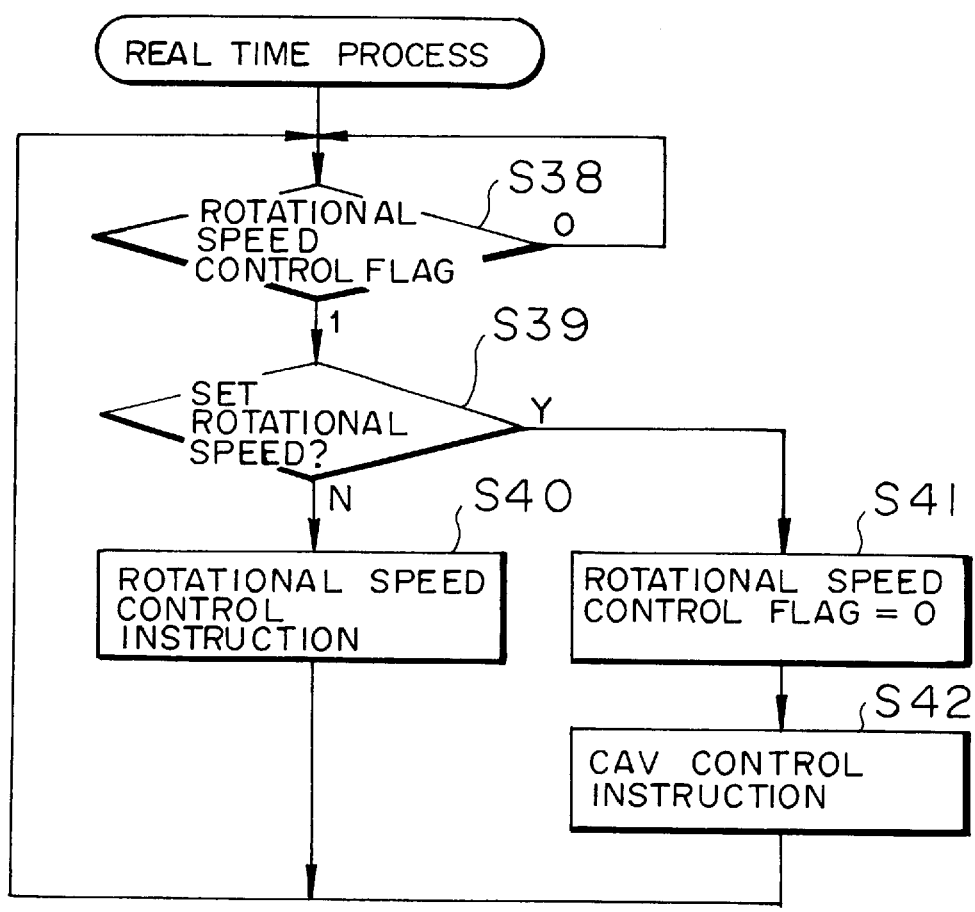
FIG. 11 is a diagram showing an operation flowchart of a rotation control unit in the controller of the information reading apparatus in the second embodiment of the invention.

When the rotational speed control flag is set to 1 in step S22, a rotational speed control unit provided for the controller 10 controls the rotational speed in accordance with an operation flowchart of FIG. 11 until it reaches a rotational speed (rotational speed of the zone #2) which has been set in correspondence to the zone (zone #2) of the movement destination of the pickup. That is, the processing routine advances from step S38 to step S39 in FIG. 11 and a check is made to see if the rotational speed of the disc that is rotating at present has reached the rotational speed of the disc which was set by the controller in correspondence to the zone #2, and a rotational speed control instruction is generated until the speed reaches the set rotational speed (step S40). When the speed reaches the set rotational speed, the rotational speed control flag of the controller 10 is reset from 1 to 0 (step S41) and the motor is CAV controlled so as to rotate at the set constant rotational speed (step S42). The controller executes the operation in FIG. 11 simultaneously with steps S23 and S20 in FIG. 5. A state of a change in rotational speed during such a period of time is shown in (b) in FIG. 6 in correspondence to the rotational speed transition region of each virtual zone.

When it is judged in step S15 that the reproduction is not started, a check is made to see if it is necessary for the optical pickup 6 to seek the region in which the target data to be read has been recorded (step S24). If necessary, the position of the target data to be sought is calculated from the TOC information (step S25). Step S26 follows and if the target data is located within the virtual zone that is at present being read, the processing routine advances to step S27. The carriage motor is driven and the seeking operation of the data is performed. After that, a check is made in step S16 to see if the reproduction is started.

In step S16, for example, when the optical pickup has moved to the outer peripheral side of the disc, there is a case where the rotational speed control unit of the controller is not controlled to the rotational speed corresponding to the zone where the data of the movement destination is located in dependence on the radial position of the data of the movement destination. For example, in case of the angular velocity that is controlled in step S14, since it exceeds the maximum sustain transfer rate (Tmax) at which the apparatus can perform the reading, there is a case where a situation such that the data cannot be read occurs. The controller, therefore, judges that the transfer rate doesn't exceed the maximum sustain transfer rate (Tmax) at which the apparatus can perform the reading in step S16. When it doesn't exceed Tmax, the reproduction is started (step S15).

When the target data doesn't exist within the virtual zone in which the target data is at present being read in step S26, the motor is set to the rotational speed corresponding to the angular velocity of the disc set in correspondence to the virtual zone having the target data (step S28). When the rotational speed of the disc reaches the rotational speed of the angular velocity corresponding to the virtual zone having the target data, the controller 10 changes the rotational speed control flag from 0 to 1 (step S29) and stores the virtual zone after the change (step S30) in place of the zone that is at present being stored. When the rotational speed control flag is switched to 1, the servo signal processor 9 CAV controls the rotation of the spindle motor 4 by the set angular velocity and seeks the target data in the zone (step S27). After that, a check is made in step S16 to see if the reproduction has been started or not. When the reproduction can be started, step S15 follows.

In step S24, when there is no need to perform the seeking operation of the optical pickup 6, the processing routine advances to step S10. When the reproduction is finished, an end process (step S11) to drive the optical pickup 6 to the home position by the carriage or the like is executed. After that, the operation is finished. When the reproduction is not finished in step S10, the reproduction of the next data is started in step S15 in accordance with a subsequent reproducing instruction.

As mentioned above, in the second embodiment of the invention, for the data recordable region of the disc, the controller 10 assumedly sets a plurality of zones and the rotational speed transition regions with a predetermined width provided between the zones. When data of each virtual zone is to be read, the angular velocity of the disc is set in such a manner that when the data of each virtual zone is read, the transfer rate of the data lies within a range in which it is not lower than the minimum guaranteed sustain transfer rate of the apparatus and doesn't exceed the maximum sustain transfer rate at which the apparatus can perform the reading, so that the data can be read in a short access time.

In the second embodiment of the invention, although the controller has set a plurality of zones and performed the operation control, for example, as shown as a third embodiment in FIG. 7, when an amount of data to be recorded on the disc is small and the data recording region has a relatively narrow zone or the like, the number of zones can be also set to one. For example, as shown as a fourth embodiment in FIG. 8, when data frequently used is concentratedly recorded in an inner peripheral portion of the disc, a region in which the data of a high use efficiency is recorded can be also set into one zone in a manner such that there is no need to change the rotational speed when the data is read.

In the innermost peripheral portion of the data recording region, it is not always necessary to set the angular velocity of the disc so as to be equalized to the minimum guaranteed sustain transfer rate of the apparatus. Further, the angular velocity can be set so as to raise the transfer rate and the number of zones can be also increased.

Among the plurality of set virtual zones, it is also possible to construct in a manner such that the zone of a high data use frequency is set to a predetermined angular velocity and is read and the other zones are respectively set at a predetermined linear velocity and are read.

The number of virtual zones and the angular velocity of each virtual zone can be also previously determined in accordance with the apparatus. For example, the user of the apparatus can also set a part or all of them as necessary.

In the fifth embodiment of the invention, a state in which a CD-ROM player controls the rotational speed of the CLV disc and reads out necessary information will now be described with reference to FIGS. 9 and 10.

In the CD-ROM player in the fifth embodiment of the invention, in order to raise the transfer rate of the inner peripheral portion in the data region of the CD-ROM to be read, for example, as shown in FIG. 9, at the position corresponding to the innermost peripheral portion of the data, the angular velocity is set to the minimum guaranteed transfer rate of the apparatus, the CAV reproduction is subsequently executed until the transfer rate is equal to the maximum sustain transfer rate (Tmax) at which the apparatus can perform the reading, and when the transfer rate reaches Tmax, the motor is controlled at a predetermined linear velocity so as to maintain the transfer rate to Tmax. It is assumed that the radial position of the disc at which the control mode is switched between the CAV and the CLV can be preset for each apparatus or the user of the apparatus can set it as necessary. The radial position of the disc at which the control mode is switched between the CAV and the CLV is set on the basis of the TOC information of the disc and is detected.

FIG. 9 is a graph showing the relations among a CAV region and a CLV region of a disc, a data transfer rate, and a rotational speed which are set by an information reading apparatus in the fifth embodiment of the invention. In the diagram, (a) shows the relation between each region and the transfer rate which were set in the disc and (b) shows the relation between each region and the rotational speed.

Figure 10:
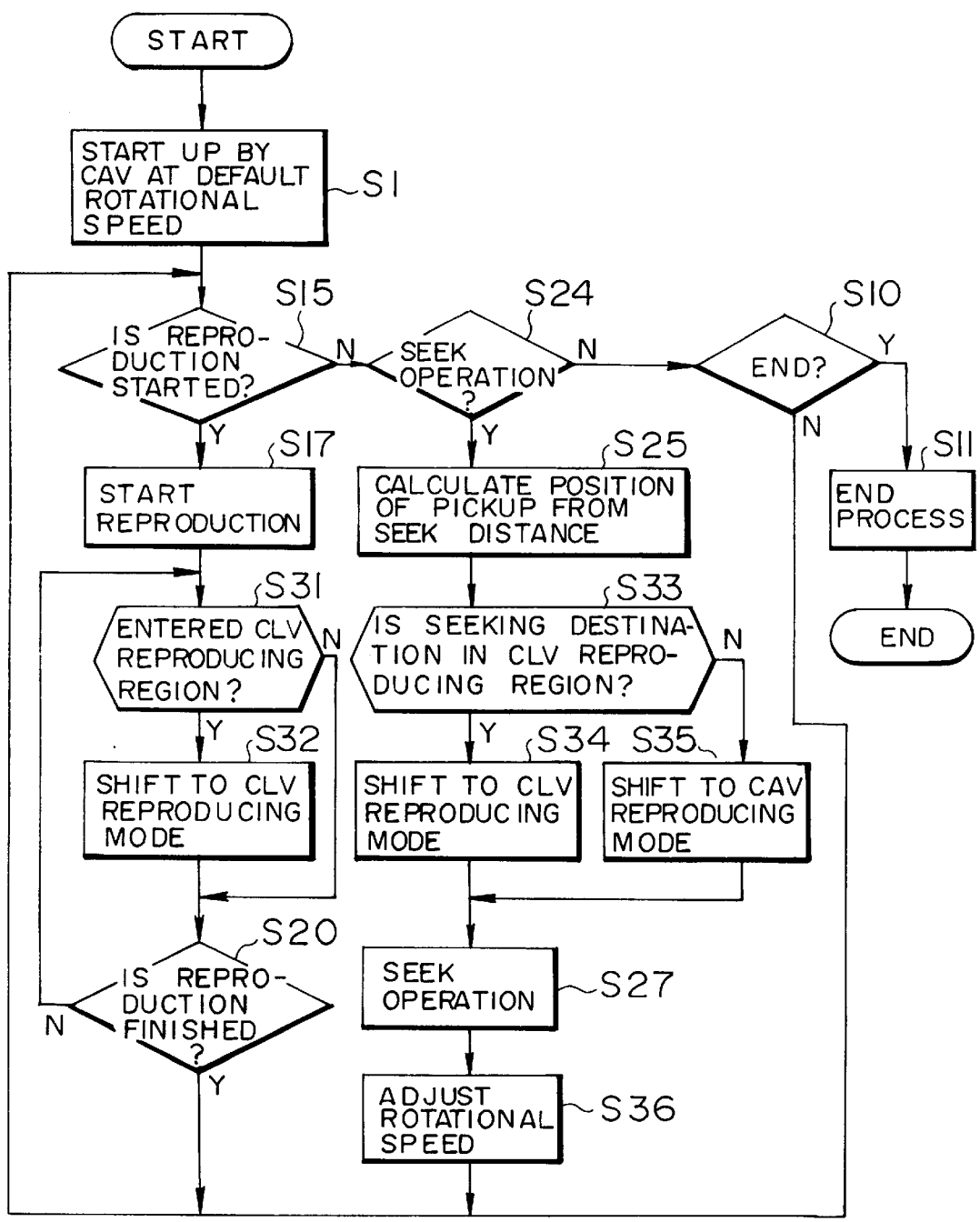
FIG. 10 is a diagram showing an operation flowchart of a controller of an information reading apparatus in the fifth embodiment of the invention.

In the fifth embodiment of the invention, FIG. 10 is an operation flowchart for the controller showing a state in which the CD-ROM player controller 10 in FIG. 1 controls the rotational speed of the CLV disc 1 and reads out necessary information.

In FIG. 10, the same operating steps as those in FIG. 2 or 5 are designated by the same step numbers.

The controller rotates the disc by first initial setting the spindle motor 4 in FIG. 1 to a default rotational speed, rotates the disc, drives the carriage motor 5, moves the optical pickup 6 to the lead-in area provided for the innermost peripheral portion of the recording information region of the CLV disc 1, and controls so that the reading operation of the TOC information that is recorded in the lead-in area can be started (step S1).

Subsequently, a check is made to see if the optical pickup has moved to the position of the data to be read and the reproduction can be started (step S15). When the reproduction can be started, step S17 follows and the reproduction is started in step S17. In this case, the controller 10 judges in step S31 whether the optical pickup has entered the CLV region in which the data to be read had been set or not. If NO, the reading operation is continued and step S20 follows. The end of the reproduction is confirmed. Step S15 follows and the reading operation of the data according to a next instruction is started.

In step S31, when the optical pickup enters the CLV region in which the data to be read has been set, the controller CLV controls the spindle motor 4 together with the servo signal processor 9 (step S32), continues the data reading operation, and advances to step S20. The end of the reproduction is confirmed. Step S15 follows and the reading operation of the data according to a next instruction is started.

When it is judged in step S15 that the reproduction is not started, a check is made to see if the optical pickup 6 needs to seek the region in which the target data to be read has been recorded (step S24). If necessary, the position of the target data to be sought is calculated by the TOC information (step S25). Subsequently, a check is made to see if the calculated position is the position of the target data or the CLV reproducing region (step S33). When it is within the CLV reproducing region, the controller CLV controls the spindle motor 4 together with the servo signal processor 9 (step S34). When calculated position doesn't exist in the CLV reproducing region, the controller CAV controls the spindle motor 4 together with the servo signal processor 9 (step S35). Step S27 follows and the carriage motor is driven and the seeking operation of the data is executed. After that, the rotational speed of the spindle motor 4 is adjusted to the rotational speed corresponding to the reading position of the target data (step S36). After that, the reproduction is started in step S15.

When there is no need to perform the seeking operation of the optical pickup 6 in step S24, step S10 follows. When the reproduction is finished, an end process (step S11) to drive the optical pickup 6 to the home position by the carriage is executed. After that, the operation is finished. When the reproduction is not finished in step S10, the reproduction of next data is started in step S15 in accordance with a subsequent reproducing instruction.

As mentioned above, prior to the reproducing operation, in FIG. 10, the controller sets and stores the radial position of the disc to switch the CAV region on the disc inner peripheral side and the CLV region on the outer peripheral side on the basis of the TOC information recorded in the CD-ROM. In the CAV region, the controller sets the rotational angular velocity of the disc in a manner such that the transfer rate when reading the data in the outermost peripheral portion of the CAV region is equal to the maximum sustain transfer rate (Tmax) at which the apparatus can perform the reading. In the CLV region subsequent to the CAV region, the controller sets the transfer rate to the constant linear velocity so as to maintain Tmax. The transfer rate of the data, therefore, can be raised and the regions can be also easily switched, so that the data can be read in a short access time.

In FIG. 9, although the linear velocity of the disc in the CLV region has been set in a manner such that the transfer rate when reading data is equal to the maximum sustain transfer rate (Tmax) at which the apparatus can perform the reading, its value can be freely set so long as it is not lower than the minimum guaranteed sustain transfer rate.

In FIG. 9, the rotational angular velocity of the disc in the CAV region has been set in a manner such that the transfer rate when reading the data in the outermost peripheral portion in the CAV region is equal to the maximum sustain transfer rate (Tmax) at which the apparatus can perform the reading. Its value, however, can be also freely set so long as it is not lower than the minimum guaranteed sustain transfer rate in the CAV region.

Since the invention has been constructed as mentioned above, when the information of the disc which has been recorded at a constant linear velocity is read at a constant angular velocity and is transmitted to an external apparatus, in the information recording region of the disc which was determined as an information recordable region, even if the information has been recorded in a narrow region, the information reading apparatus sets the rotational angular velocity of the disc so as to obtain the maximum sustain transfer rate at which the apparatus can perform the reading at the radial position where the region of the information recorded in the disc is covered. The access time, consequently, is also short and the information of the disc can be generated at a speed higher than the conventional one.

When the information of the disc which has been recorded at a constant linear velocity is read at a constant angular velocity and is transmitted to an external apparatus, in the information recording region of the disc which was determined as an information recordable region, even if the information has been recorded in a narrow region, the information reading apparatus sets the rotational angular velocity of the disc on the basis of the recording region information such as a TOC or the like that is previously read so as to obtain the maximum sustain transfer rate at which the apparatus can perform the reading at the radial position where the region of the information recorded in the disc is covered. The access time, consequently, is also short and the information of the disc can be generated at a speed higher than the conventional one.

When the information of the disc which has been recorded at a constant linear velocity is read at a constant angular velocity and is transmitted to an external apparatus, irrespective of an extent of a region of the information to be recorded in the information recording region of the disc which was determined as an information recordable region, the information reading apparatus sets the rotational angular velocity of the disc so as to obtain the maximum sustain transfer rate at which the apparatus can perform the reading at the radial position corresponding to the outermost peripheral portion of the region of the information recorded in the disc. The access time, consequently, is also short and the information of the disc can be generated at a speed higher than the conventional one.

When the information of the disc which has been recorded at a constant linear velocity is read at a constant angular velocity and is transmitted to an external apparatus, irrespective of an extent of a region of the information to be recorded in the information recording region of the disc which was determined as an information recordable region, the information reading apparatus sets the rotational angular velocity of the disc on the basis of the recording region information such as a TOC or the like which is previously read so as to obtain the maximum sustain transfer rate at which the apparatus can perform the reading at the radial position corresponding to the outermost peripheral portion of the region of the information recorded in the disc. The access time, consequently, is also short and the information of the disc can be generated at a speed higher than the conventional one.

When the information of the disc which has been recorded at a constant linear velocity is read at a constant angular velocity and is transmitted to an external apparatus, the radial position corresponding to the outermost peripheral portion in the region of the information recorded in the disc is detected by the position detecting means, and the rotational angular velocity of the disc is set so as to obtain the maximum sustain transfer rate at which the apparatus can perform the reading at the corresponding radial position. The access time, consequently, is also short and the information of the disc can be generated at a speed higher than the conventional one.

When the information of the disc which has been recorded at a constant linear velocity is read at a constant angular velocity and is transmitted to an external apparatus, while setting the innermost peripheral portion of the recorded information to the angular velocity at which the information is read at the minimum guaranteed sustain transfer rate of the apparatus and reading the information, a value of the changing transfer rate is monitored, and when the transfer rate reaches the maximum sustain transfer rate at which the apparatus can perform the reading, the value of the angular velocity is reset so as to be a transfer rate that is not lower than the minimum guaranteed sustain transfer rate. The apparatus, consequently, can generate the information of the disc at a speed higher than the conventional one without exceeding the maximum sustain transfer rate at which the apparatus can perform the reading.

When the information of the disc which has been recorded at a constant linear velocity is read and transmitted to an external apparatus, the apparatus distinguishes the information recorded in the disc into the inner peripheral side region and the outer peripheral side region at a predetermined radial position, reads the information at a constant angular velocity in the inner peripheral side region, and reads the information at a constant linear velocity in the outer peripheral side region, so that the information of the disc can be generated at a speed higher than the conventional one.

When the information of the disc which has been recorded at a constant linear velocity is read and transmitted to an external apparatus, the apparatus distinguishes the information recorded in the disc into the inner peripheral side region and the outer peripheral side region at a predetermined radial position, sets the transfer rate to the angular velocity at which the innermost peripheral portion of the recorded information is read at the minimum guaranteed sustain transfer rate of the apparatus in the inner peripheral side region, reads the information at a constant angular velocity, and reads the information of the disc at a constant linear velocity in the outer peripheral side region, so that the apparatus can generate the information of the disc at a speed higher than the conventional one without being lower than the minimum guaranteed sustain transfer rate.

When the information of the disc which has been recorded at a constant linear velocity is read and transmitted to an external apparatus, the apparatus distinguishes the information recorded in the disc into the inner peripheral side region and the outer peripheral side region at a predetermined radial position, sets the transfer rate to the angular velocity at which the innermost peripheral portion of the recorded information is read at the minimum guaranteed sustain transfer rate of the apparatus in the inner peripheral side region, reads the information at a constant angular velocity, sets the value of the linear velocity on the basis of the maximum sustain transfer rate at which the apparatus can perform the reading the information of the disc in the outer peripheral side region, and reads the information at a constant linear velocity. The apparatus, consequently, can generate the information of the disc at a speed higher than the conventional one without being lower than the minimum guaranteed sustain transfer rate and, even in the outer peripheral side region, without exceeding the maximum sustain transfer rate at which the information of the disc can be read.

When the information of the disc which has been recorded at a constant linear velocity is read and transmitted to an external apparatus, the apparatus distinguishes the information recorded in the disc into the inner peripheral side region and the outer peripheral side region at a predetermined radial position, sets the value of the angular velocity in a manner such that the transfer rate of the information at a predetermined radial position to distinguish the inner peripheral side and the outer peripheral side is equal to the maximum sustain transfer rate at which the apparatus can perform the reading in the inner peripheral side region, reads the information of the disc at a constant angular velocity, and reads the information of the disc at a constant linear velocity in the outer peripheral side region. The information of the disc, consequently, can be outputted at a speed higher than the conventional one.

When the information of the disc which has been recorded at a constant linear velocity is transmitted to an external apparatus, the information of the disc is read at a constant angular velocity and when the transfer rate reaches the maximum sustain transfer rate at which the apparatus can perform the reading, the control mode is switched to the constant linear velocity control and the motor is controlled. The information of the disc, consequently, can be generated at a speed higher than the conventional one without exceeding the maximum sustain transfer rate at which the apparatus can perform the reading.

When the information of the disc which is recorded at a constant linear velocity is transmitted to an external apparatus, the information of the disc is read at a constant angular velocity and when the transfer rate reaches the maximum sustain transfer rate at which the apparatus can perform the reading, the linear velocity at which the apparatus can perform the reading at the maximum sustain transfer rate is set, the control mode is switched to the constant linear velocity control, and the motor is controlled. The information of the disc, consequently, can be generated at a speed higher than the conventional one without exceeding the maximum sustain transfer rate at which the apparatus can perform the reading.

What is claimed is:

1. An information reading apparatus comprising:
   means for rotating at a constant angular velocity a disk-shaped recording medium on which information has been recorded at a constant linear velocity;
   reading means for reading the recording information of said disk-shaped recording medium and transmitting the read information to an external apparatus through a buffer memory; and
   setting means for setting a rotational angular velocity of said disk-shaped recording medium in a manner such that at a predetermined radial position excluding the outermost peripheral portion of an information recording region of said disk-shaped recording medium, a transfer rate when said read information is transferred to said buffer memory is equal to a maximum sustain transfer rate at which said information reading apparatus can perform a reading.

2. An apparatus according to claim 1, wherein said radial position is determined on the basis of recording region information recorded on said disk-shaped recording medium.

3. An information reading apparatus comprising:
   means for rotating at a constant angular velocity a disk-shaped recording medium on which information has been recorded at a constant linear velocity;
   information reading means for reading the recording information of said disk-shaped recording medium and transmitting the read information to an external apparatus through a buffer memory; and
   setting means for setting a rotational angular velocity of said disk-shaped recording medium in a manner such that at a radial position corresponding to the outermost peripheral portion of a region in which said information of said disk-shaped recording medium has been recorded, a transfer rate when said read information is transferred to said buffer memory is equal to a maximum sustain transfer rate at which said information reading apparatus can perform a reading.

4. An apparatus according to claim 3, wherein said radial position is determined on the basis of recording region information recorded on said disk-shaped recording medium.

5. An information reading apparatus comprising:

means for rotating at a constant angular velocity a disk-shaped recording medium on which information has been recorded at a constant linear velocity;

information reading means for reading the recording information of said disk-shaped recording medium and transmitting the read information to an external apparatus through a buffer memory; and setting means for setting a rotational angular velocity of said disk-shaped recording medium; and position detecting means for detecting a radial position corresponding to the outermost peripheral portion of a region in which said information of said disk-shaped recording medium has been recorded, wherein said setting means sets the rotational angular velocity of said disk-shaped recording medium in a manner such that a transfer rate when the information read from said disk-shaped recording medium is transferred to said buffer memory is equal to a maximum sustain transfer rate at which said information reading apparatus can perform a reading at a radial position which was detected by said position detecting means and corresponds to the outermost peripheral portion of the region in which said information has been recorded.

6. An information reading apparatus comprising:

means for rotating at a constant angular velocity a disk-shaped recording medium on which information has been recorded at a constant linear velocity;

information reading means for reading the recording information of said disk-shaped recording medium and transmitting the read information to an external apparatus through a buffer memory; and setting means for setting said angular velocity on the basis of a minimum guaranteed sustain transfer rate of said information reading apparatus; and detecting means for detecting that a transfer rate when the information read from said disk-shaped recording medium is transferred to said buffer memory has reached a maximum sustain transfer rate at which said information reading apparatus can perform a reading, wherein said setting means resets said angular velocity in a manner such that when it is detected by said detecting means that said transfer rate has reached the maximum sustain transfer rate at which said information reading apparatus can perform a reading, said transfer rate is not lower than said minimum guaranteed sustain transfer rate.

7. An information reading apparatus comprising:

driving means for rotating a disk-shaped recording medium on which information has been recorded at a constant linear velocity;

information reading means for reading the recording information from said disk-shaped recording medium and transmitting the read information to an external apparatus through a buffer memory; and rotation control means for controlling said driving means in a manner such that said disk-shaped recording medium is rotated at a predetermined angular velocity up to a predetermined radial position from an innermost peripheral portion of a region in which said information has been recorded in said disk-shaped recording medium and that said disk-shaped recording medium is rotated at a constant linear velocity after said predetermined radial position.

8. An apparatus according to claim 7, wherein said angular velocity is set on the basis of a minimum guaranteed sustain transfer rate of said information reading apparatus.

9. An apparatus according to claim 7, wherein said linear velocity is set on the basis of a maximum sustain transfer rate at which said information reading apparatus can perform a reading.

10. An apparatus according to claim 7, wherein said radial position is set in a manner such that when said disk-shaped recording medium is rotated at said angular velocity, said radial position is equal to a radial position from an innermost peripheral portion of the information recording region of said disk-shaped recording medium at a time point when the transfer rate when the information read from said disk-shaped recording medium is transferred to said buffer memory reaches a maximum sustain transfer rate at which said information reading apparatus can perform a reading.

11. An information reading apparatus comprising:

driving means for rotating a disk-shaped recording medium on which information has been recorded at a constant linear velocity;

information reading means for reading the recording information of said disk-shaped recording medium and transmitting the read information to an external apparatus through a buffer memory;

rotation control means for controlling a rotation of said disk-shaped recording medium; and detecting means for detecting that a transfer rate when the information read from said disk-shaped recording medium is transferred to said buffer memory has reached a maximum sustain transfer rate at which said information reading apparatus can perform a reading, wherein when the information read from said disk-shaped recording medium is transferred to said buffer memory, said rotation control means switches a control mode from a constant angular velocity control to a constant linear velocity control in accordance with an output signal of said detecting means and controls the rotation of said disk-shaped recording medium.

12. An apparatus according to claim 11, wherein when the control mode is switched from said constant angular velocity control to said constant linear velocity control and the rotation of said disk-shaped recording medium is controlled, said rotation control means controls a value of said linear velocity in a manner such that the information read from said disk-shaped recording medium is transferred to said buffer memory at a maximum sustain transfer rate at which said information reading apparatus can perform the reading.

* * * * *